(12) United States Patent (10) Patent No.: US 9,117,314 B2
Tomida (45) Date of Patent: Aug. 25, 2015

(54) INFORMATION OUTPUT APPARATUS, METHOD, AND RECORDING MEDIUM FOR DISPLAYING INFORMATION ON A VIDEO DISPLAY

(75) Inventor: Takahiro Tomida, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 83 days.

(21) Appl. No.: 13/484,344

(22) Filed: May 31, 2012

(65) Prior Publication Data

US 2012/0236004 A1 Sep. 20, 2012

Related U.S. Application Data

(62) Division of application No. 12/397,607, filed on Mar. 4, 2009, now abandoned.

(30) Foreign Application Priority Data

Mar. 5, 2008 (JP) ................................. 2008-055400

(51) Int. Cl.
*G06T 11/60* (2006.01)

(52) U.S. Cl.
CPC ...................................... *G06T 11/60* (2013.01)

(58) Field of Classification Search
CPC .............................. G06T 11/60; G06F 17/214
USPC .................... 345/472, 472.1, 472.2; 715/269
See application file for complete search history.

(56) References Cited

U.S. PATENT DOCUMENTS

2007/0094591 A1 4/2007 Etgen et al.

FOREIGN PATENT DOCUMENTS

JP 2008-210116 9/2008

OTHER PUBLICATIONS

Henri Sivonen; Bugzilla@Mozilla—Bug 31961; feature to zoom so the majority of text on a page is user's default size; Mar. 15, 2000; 10 pages, https://bugzilla.mozilla.org/show_bug.cgi?id=31961.*
United States Office Action corresponding to U.S. Appl. No. 12/397,607 mailed on Mar. 1, 2012.
Percy Cabello, Improve Firefox accessibility with minimum font size, Jun. 16, 2007, mozilla links at mozzillalinks.org.http://mozillalinks.org/2007/06/improve-firefox-accessibility-with-minimum-font-size/.
Iain Lamb, typograph, Mar. 29, 2008, Internet Archive, http://web.archive.org/web/20080329214448/http://lamb.cc/typograph/.
United States Office Action corresponding to U.S. Appl. No. 12/397,607 mailed on Nov. 21, 2011.
Henri Sivonen: Autozoom Extension for Firefox; Internet Archive for http://hsivonen.iki.fi/ and Internet Archive for http://hsivonen.iki.fi/autozoom/; Sep. 26, 2006; 7 pages.
Japanese Office Action for 2008-055400 mailed on Dec. 22, 2009.

* cited by examiner

*Primary Examiner* — Jeffery A Brier
(74) *Attorney, Agent, or Firm* — Amin, Turocy & Watson, LLP

(57) ABSTRACT

The most-frequently-used font size on a Web page acquired from a server unit is determined. The font size is changed so that the font of the most-frequently-used font size (Sdominant) may take a preset optimum font size (Sopt). At the same time, the fonts of the remaining font sizes are changed as much (Sdiff=Sopt−Sdominant) as in the font size changing process.

2 Claims, 9 Drawing Sheets

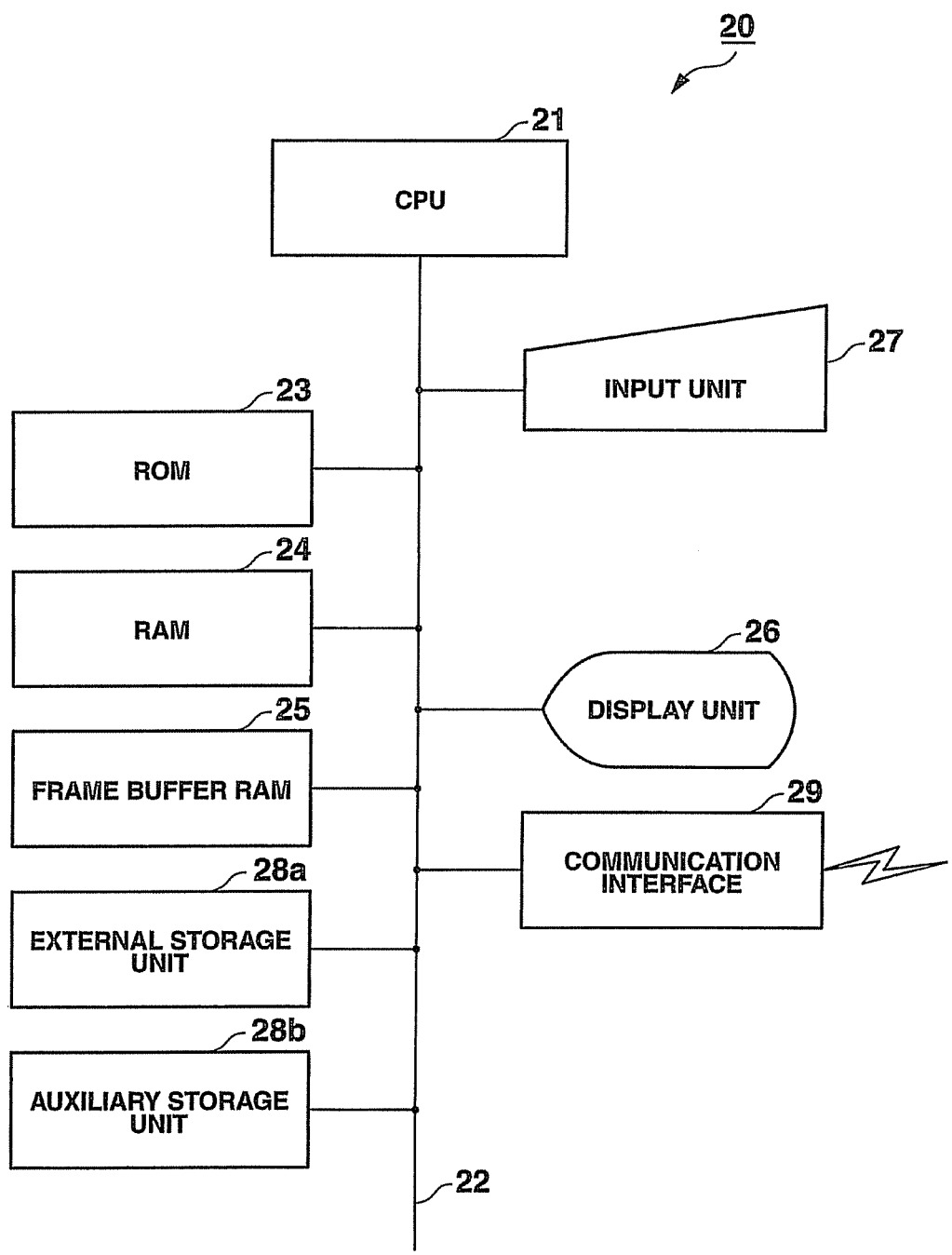

FIG.4

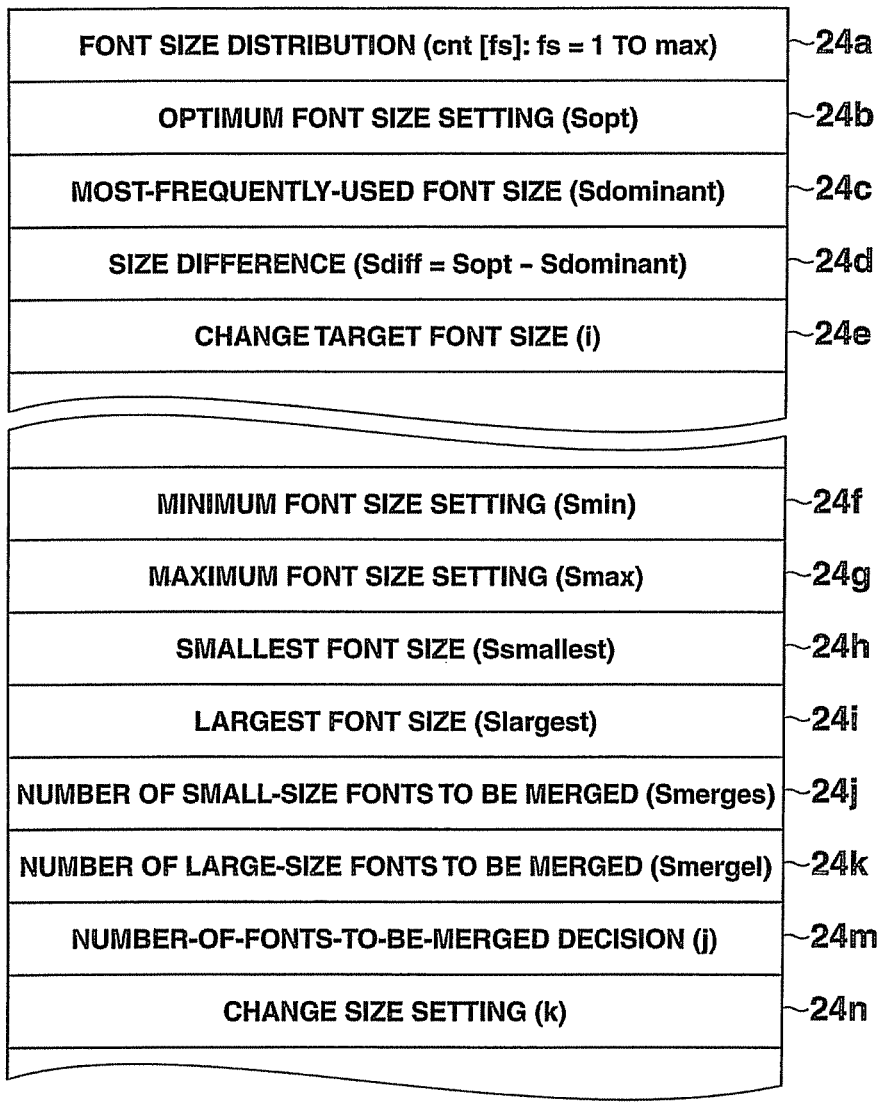

| FONT SIZE DISTRIBUTION (cnt [fs]: fs = 1 TO max) | ~24a |
| OPTIMUM FONT SIZE SETTING (Sopt) | ~24b |
| MOST-FREQUENTLY-USED FONT SIZE (Sdominant) | ~24c |
| SIZE DIFFERENCE (Sdiff = Sopt − Sdominant) | ~24d |
| CHANGE TARGET FONT SIZE (i) | ~24e |
| MINIMUM FONT SIZE SETTING (Smin) | ~24f |
| MAXIMUM FONT SIZE SETTING (Smax) | ~24g |
| SMALLEST FONT SIZE (Ssmallest) | ~24h |
| LARGEST FONT SIZE (Slargest) | ~24i |
| NUMBER OF SMALL-SIZE FONTS TO BE MERGED (Smerges) | ~24j |
| NUMBER OF LARGE-SIZE FONTS TO BE MERGED (Smergel) | ~24k |
| NUMBER-OF-FONTS-TO-BE-MERGED DECISION (j) | ~24m |
| CHANGE SIZE SETTING (k) | ~24n |

FIG.5

```
var fontSize = node.ownerDocument.defaultView.getComputedStyle(node,
" ").getPropertyValue("font-size");
```

FIG.6

```
node.style.fontSize = 16px:
```

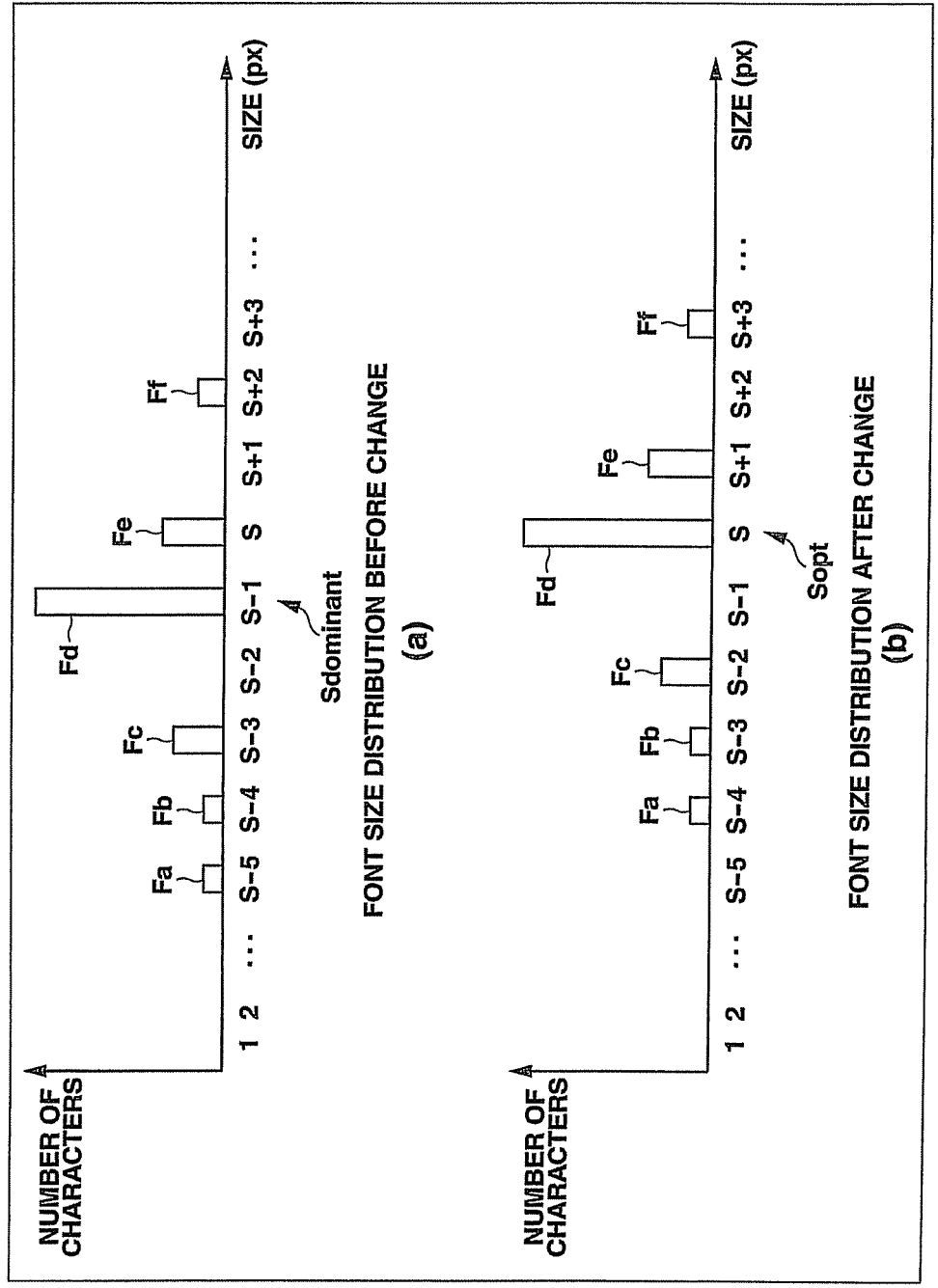

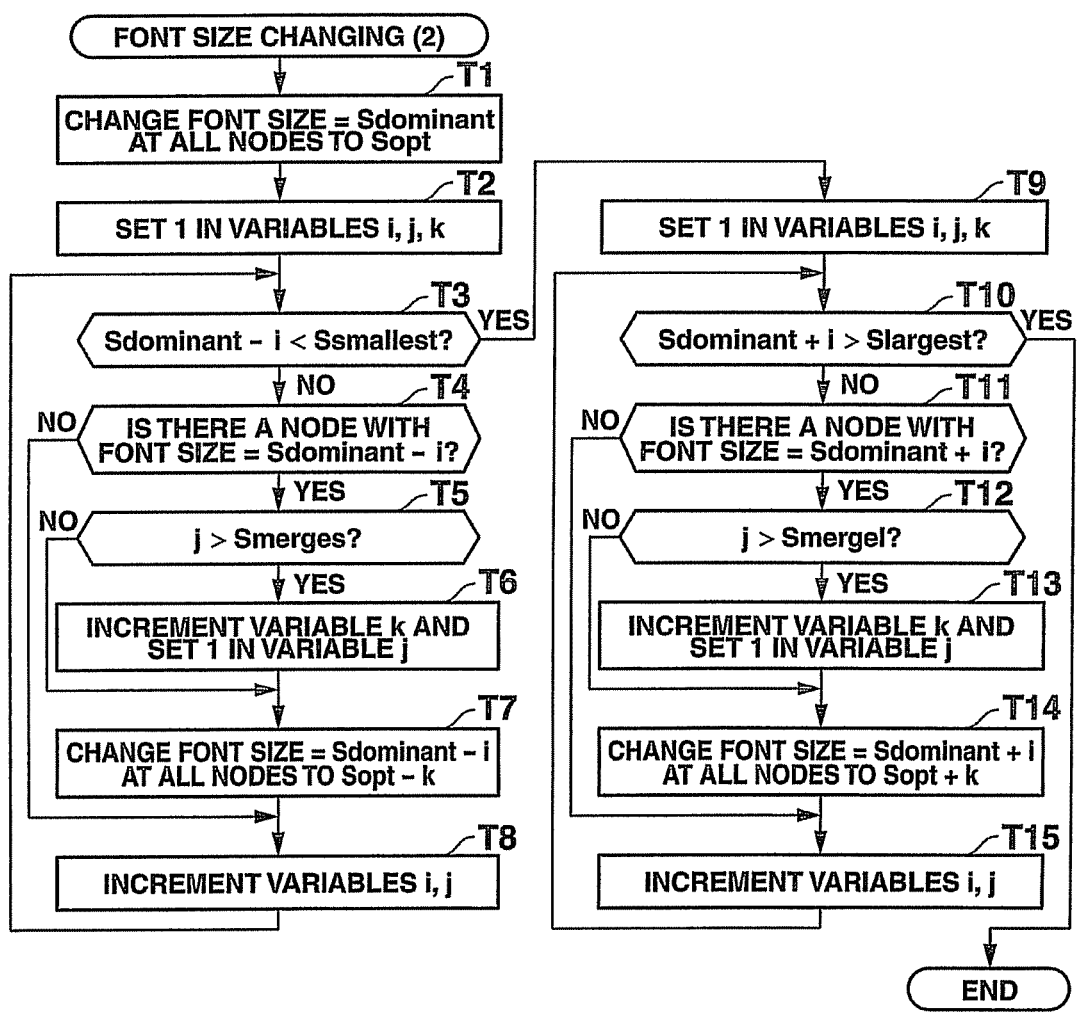

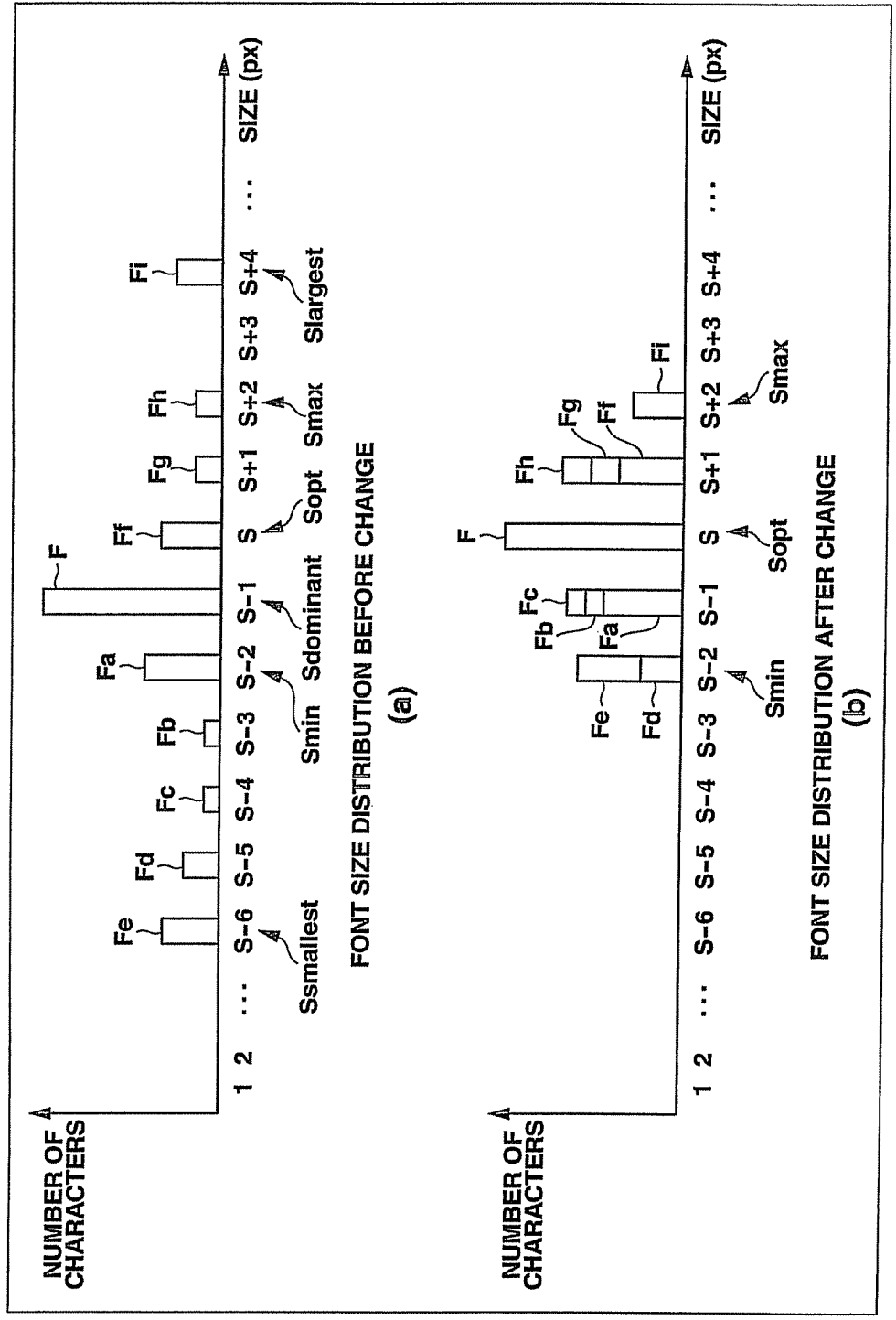

INFORMATION OUTPUT APPARATUS, METHOD, AND RECORDING MEDIUM FOR DISPLAYING INFORMATION ON A VIDEO DISPLAY

CROSS-REFERENCE TO RELATED APPLICATIONS

This application is a Division of application Ser. No. 12/397,607 filed Mar. 4, 2009, which is based upon and claims the benefit of priority from prior Japanese Patent Application No. 2008-055400, filed Mar. 5, 2008, the entire contents of both of which are hereby incorporated herein by reference.

BACKGROUND OF THE INVENTION

1. Field of the Invention

The invention relates to an information output apparatus and an information output method and an information output processing program which cause a browser to output a Web page loaded from, for example, a server unit into a client unit to enable the user to browse the Web page.

2. Description of the Related Art

In a recent client-server system as typified by the Internet, a wide area network (WAN), or a local area network (LAN), it is common practice to cause a browser to output a Web page loaded from a server unit into a client unit, thereby enabling the user to browse the Web page.

The Web page offered by the server unit is generally created in such a manner that the character size (or font size), color, and shape are changed according to each different piece of information dealt with in the divided areas of the page, for example, according to the attention-grabbing level, taking into account the balance of the entire page.

As a client unit, a terminal device whose display screen size differs variously, such as a personal computer (PC), a personal digital assistant (PDA), or a mobile phone, is used.

Therefore, when browsing a Web page on a relatively large display screen of a terminal device, such as a PC, the user can sufficiently read the information displayed even in a small font size. However, when browsing the Web page on a small display screen of, for example, a mobile phone, the user might not sufficiently read the information displayed in the same small font size. Conversely, the information displayed in a large font size is displayed widely on the small display screen, making it difficult to grasp the whole information.

To overcome this problem, a method of and system for improving the readability of text have been considered (e.g., Jpn. Pat. Appln. KOKAI Publication No. 2007-122708). In the method and system, when text is displayed on a display unit, the font size of the text is changed so as to be not smaller than the limit value of the readable font size.

With the method and system, characters smaller than the limit value of the readable font size are increased uniformly in their size until the limit value of the readable font size has been exceeded. Therefore, in a Web page where text items of various font sizes are mixed together, the correlation between the font sizes and layouts of the text items collapses, which causes the problem of impairing the balance of the entire page taken into account at the time of creating the page.

BRIEF SUMMARY OF THE INVENTION

It is, accordingly, an object of the invention to provide an information output apparatus and an information output method and a recording medium which enable characters of different font sizes to be read sufficiently without impairing the font size balance of the entire page.

According to an aspect of the invention, there is provided an information output apparatus comprising: size setting module for presetting a specified font size for the font sizes of text items included in display data; size distribution extraction module for extracting the frequency of use for each of the font sizes of text items included in the display data; size determination module for determining a font size whose frequency of use is high among the frequencies of use of the font sizes extracted by the size distribution extraction module; size difference calculation module for calculating a font size difference by subtracting the font size with a high frequency of use determined by the size determination module from the specified font size preset by the size setting module; and size changing module for changing the font sizes of text items included in the display data on the basis of the difference between the specified font size and the font size with a high frequency of use calculated by the size difference calculation module.

According to another aspect of the invention, there is provide a recording medium capable of causing a computer to realize the main functions of the information output apparatus of the invention.

With the information output apparatus of the invention, characters of difference font sizes can be read sufficiently without impairing the font size balance of the entire page.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a block diagram showing the circuit configuration of a client unit 20 in the client-server system;

FIG. 4 shows the contents of a data memory secured in a RAM 24 of the client unit 20;

FIG. 5 shows an example of a Java (a registered trademark) program for extracting the font size of text displayed on a Web page;

FIG. 6 shows an example of a Java (a registered trademark) program for changing the font size of text displayed on a Web page;

FIG. 9 is a diagram showing a comparison between font size distribution data (a) before a change and font size distribution data (b) after the change in the Web-page font-size changing process (I) at the client unit 20 according to the first embodiment;

FIG. 10 is a flowchart to explain a Web-page font-size changing process (II) at the client unit 20 according to a second embodiment of the invention; and FIG. 11 is a diagram showing a comparison between font size distribution data (a) before a change and font size distribution data (b) after the change in the Web-page font-size changing process (II) at the client unit 20 according to the second embodiment.

DETAILED DESCRIPTION OF THE INVENTION

Hereinafter, referring to the accompanying drawings, embodiments of the invention will be explained.

First Embodiment

Figure 1:
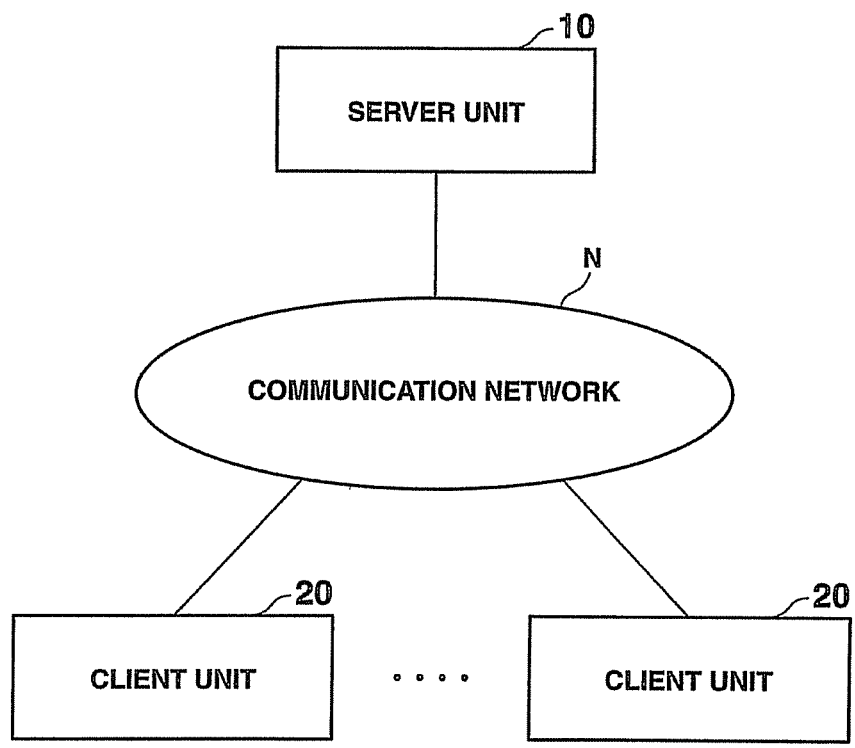
FIG. 1 is a block diagram showing the configuration of a client-server system according to a first embodiment of the invention.

FIG. 1 is a block diagram showing the configuration of a client-server system according to a first embodiment of the invention.

The client-server system includes a plurality of client units 20 and a server unit 10 which are connected to a network composed of the Internet, WANs, LANs, and the like.

The server unit 10 has a plurality of application programs activated by operating the server unit 10, including a Web page creating program, a registered user managing program, a Web page delivering program, a mailing program, and a word-processing program. In response to access requests from the client units 20 user-registered in, for example, the server unit 10, the server unit 10 delivers the requested Web pages to the individual client units 20.

The client units 20, which include mobile phones, PDAs, and PCs, have a plurality of application programs activated by operating the terminal device 20, including an Internet connecting program, a Web display program, a Web printing program, a mailing program, a word-processing program, and an image processing program. For example, the client unit 20 accesses the server unit 10 at a desired Web site and acquires the Web page and displays or prints it.

Figure 2:
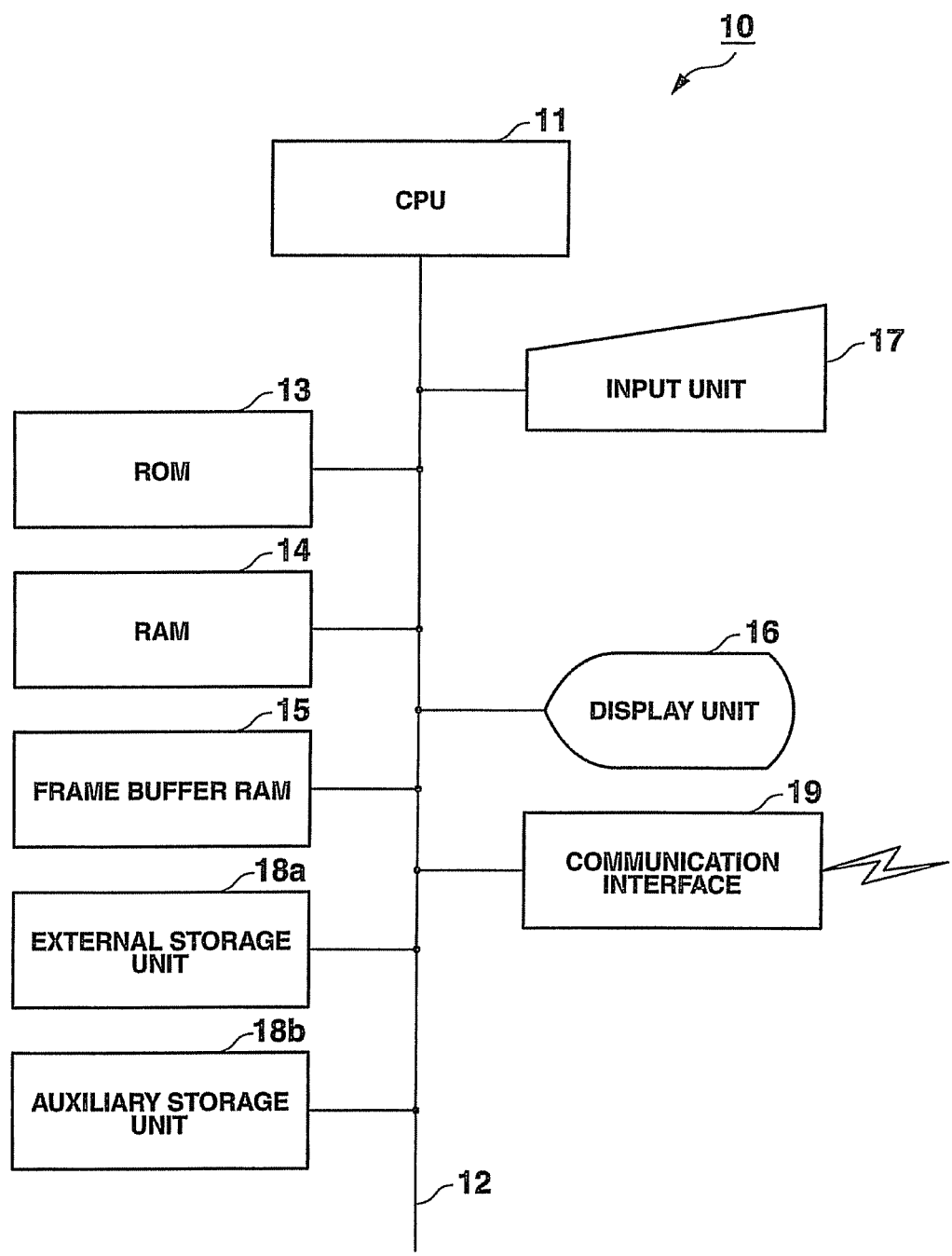
FIG. 2 is a block diagram showing the circuit configuration of a server unit 10 in the client-server system.

FIG. 2 is a block diagram showing the circuit configuration of the server unit 10 in the client-server system.

The server unit 10 includes a CPU 11 serving as a computer. A ROM 13, a RAM 14, a frame buffer RAM 15, and a display unit 16 are connected to the CPU 11 via a bus 12.

Further connected to the CPU 11 via the bus 12 are an input unit 17, such as a keyboard or a mouse, an external storage unit 18a, an auxiliary storage unit 18b, and a communication interface 19 for communicating with the client units 20.

The CPU 11 controls the operation of each part of the circuit using the RAM 14 as a working memory according to a system program and various application programs prestored in the ROM 13. In response to, for example, a key input signal from the input unit 17 or a Web page acquisition request signal corresponding to the user operation from the client unit 20 received via the communication interface 19, the CPU 11 activates and executes the various programs.

FIG. 3 is a block diagram showing the circuit configuration of the client unit 20 in the client-server system.

The client unit 20 includes a CPU 21 serving as a computer. A ROM 23, a RAM 24, and a frame buffer RAM 25 are connected to the CPU 21 via a bus 22. The drawing data written to the frame buffer 25 is output to a display unit 26, which displays the data.

Further connected to the CPU 21 via the bus 22 are an input unit 27, such as a keyboard or a mouse, an external storage unit 28a, an auxiliary storage unit 28b, and a communication interface 29 for communicating with the server unit 10.

The CPU 21 controls the operation of each part of the circuit using the RAM 24 as a working memory according to a system program and various application programs prestored in the ROM 23. According to an input signal from the input unit 27, the CPU 21 activates and executes the various application programs.

If the server unit 10 is a Web site on the Internet (N) and the client units 20 are user terminals capable of accessing the Web site, a user terminal (20) delivers a Web page described in Hypertext Markup Language (HTML) at the Web site (10) to the access requesting user terminal (20) in response to the request for access to the Web site (10). The Web page is expanded by its Web display program (or Web browser) and the expanded page is displayed on the display unit 26.

Figure 7:
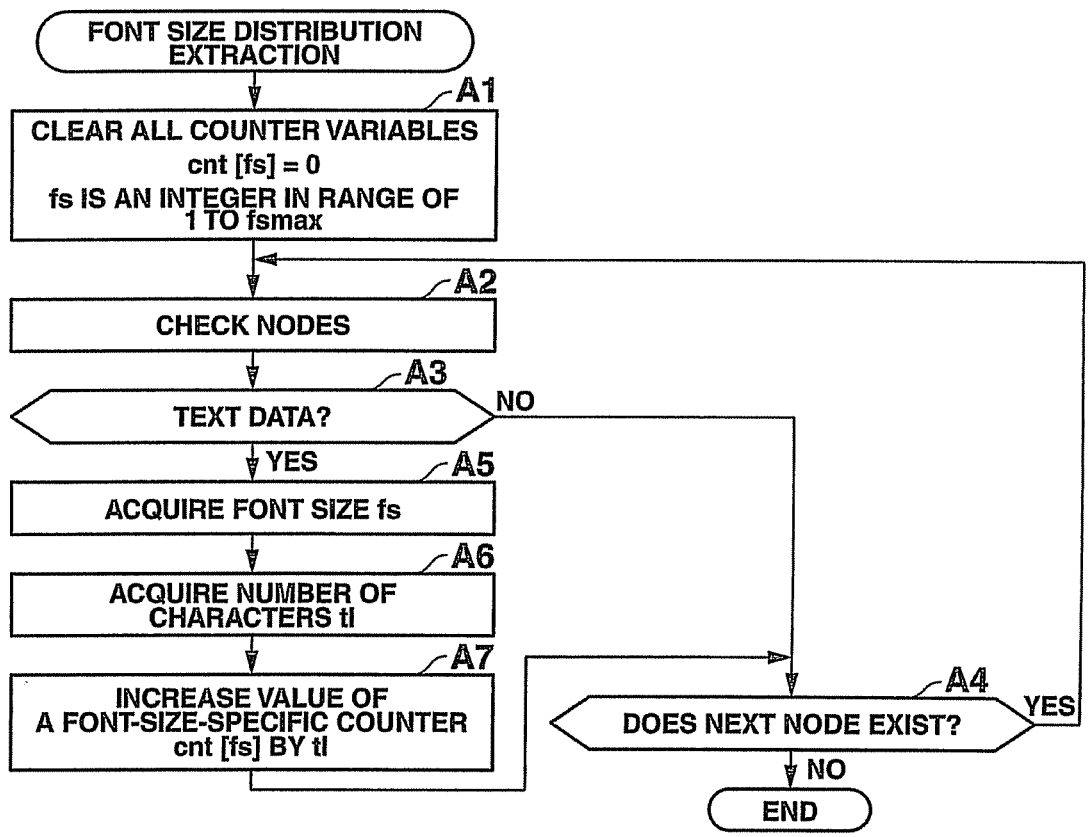
FIG. 7 is a flowchart to explain the process of extracting the font size distribution on a Web page at the client unit 20.

When the client unit 20 of the first embodiment receives a Web page from the server unit 10 and displays the page on the display unit 26, the client unit 20 carries out the process of extracting the font sizes of all the text items displayed on the Web page and generating the distribution of the font sizes (see FIG. 7 and (a) in FIG. 9). The client unit 20 further carries out the process of not only changing text of the most-frequently-used font size (Sdominant) determined from the font size distribution into text of the optimum font size (Sopt) preset according to the screen size of the display unit 26 but also changing the font sizes of the remaining text items according to the size difference between the optimum font size (Sopt) and the most-frequently-used font size (Sdominant) (see FIG. 8 and (b) in FIG. 9).

This makes it possible to change the sizes of text items displayed in various sizes on the Web page without losing the size balance, with the optimum font size (Sopt) as a reference, thereby displaying a user-friendly Web page.

FIG. 4 shows the contents of a data memory secured in the RAM 24 of the client unit 20.

The client unit 20 of the first embodiment prepares a font size distribution memory 24a, an optimum font size setting memory 24b, a most-frequently-used font size memory 24c, a size difference memory 24d, a change target font size memory 24e, and others.

In the font size distribution memory 24a, distribution data on the font sizes of all the text items displayed on the Web page acquired from the server unit 10 is stored in the form of distribution data (cnt[fs]:fs=1 to max) obtained by counting the number of characters for each font size (pixel).

In the optimum font size setting memory 24b, the optimum font size (Sopt) preset according to the screen size of the display unit 26 or set arbitrarily by the user.

In the most-frequently-used font size memory 24c, the most-frequently-used font size (Sdominant) determined on the basis of the font size distribution stored in the font size distribution memory 24a is stored.

In the size difference memory 24d, the size difference (Sdiff) obtained by subtracting the most-frequently-used font size (Sdominant) stored in the most-frequently-used font size memory 24c from the optimum font size (Sopt) stored in the optimum font size setting memory 24b is stored.

In the change target font size memory 24e, a font size to be changed in changing the font sizes of the text items different in font size displayed on the Web page is stored.

In FIG. 4, a minimum font size setting memory 24f to a change size setting memory 24n will be explained later in a second embodiment of the invention.

Figure 8:
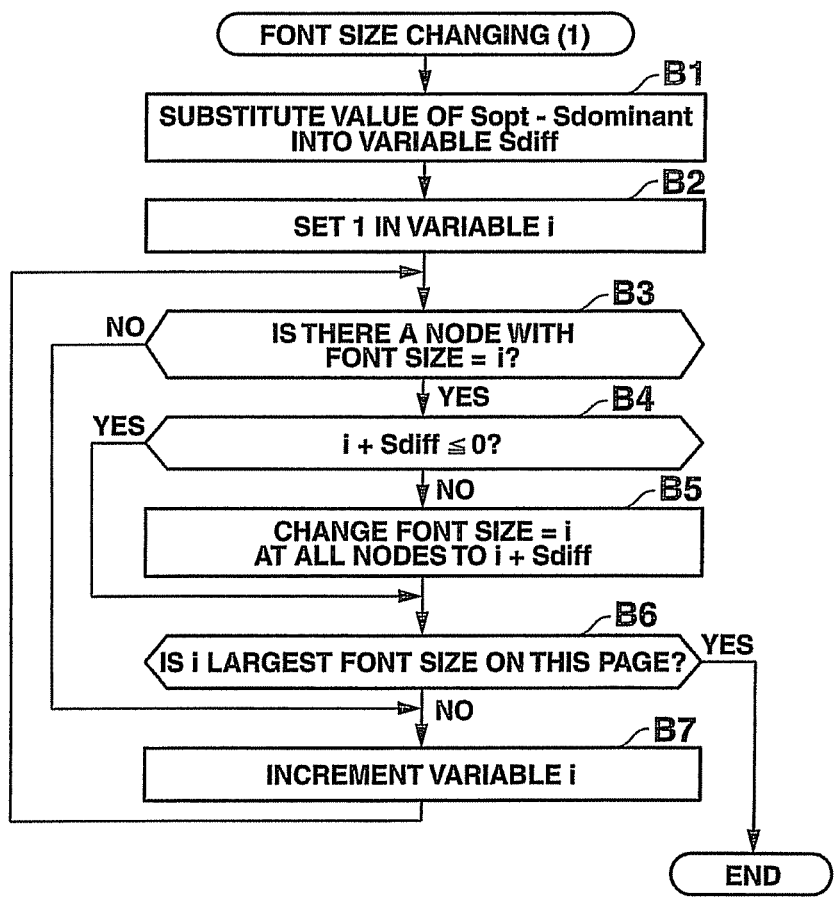
FIG. 8 is a flowchart to explain a Web-page font-size changing process (I) at the client unit 20 according to the first embodiment.

In the client unit 20, when the Web page acquired from the server unit 10 is displayed on the display unit 26, both the process of extracting the font size distribution on the Web page (see FIG. 7 and (a) in FIG. 9) and the process of changing the font size (see FIG. 8 and (b) in FIG. 9) are realized by a program plugged in or added on the Web display program (or browser) of the client unit 20.

In the font size distribution extraction process, a program written in, for example, JavaScript (registered trademark) extracts the font sizes of all the nodes in a document object model (DOM) tree. Specifically, the program is as shown in FIG. 5.

FIG. 5 shows an example of a JavaScript (a registered trademark) program for extracting the font size of text displayed on a Web page.

FIG. 6 shows an example of a JavaScript (a registered trademark) program for changing the font size of text displayed on a Web page.

Next, a Web-page font-size optimization function of the client unit 20 will be explained.

FIG. 7 is a flowchart to explain the process of extracting the font size distribution on a Web page at the client unit 20.

FIG. 8 is a flowchart to explain a Web-page font-size changing process (I) at the client unit 20 in the first embodiment.

FIG. 9 is a diagram showing a comparison between font size distribution data (a) before a change and font size distribution data (b) after the change in the Web-page font-size changing process (I) at the client unit 20 in the first embodiment.

First, the values of the counter variables corresponding to all the font sizes stored in the font size distribution memory 24a are cleared for initialization (cnt[fs]=0:fs=1 to max(px): px is a pixel) (step A1).

Next, a DOM tree of HTML data used to display the Web page is analyzed, checking each of the nodes (step A2). It is determined whether the node is a node which has text data to be displayed (step A3).

If it has been determined that the checked node of the DOM tree is not a node which has text data to be displayed (No in step A3), it is determined whether the next node exists (step A4).

If it has been determined that the next node exists (Yes in step A4), it is determined whether the next node is a node which has text data to be displayed (steps A2 and A3).

If it has been determined that the checked node of the DOM tree is a node which has text data to be displayed (Yes in step A3), not only is the font size fs of the text data acquired (step A5) but also the number of characters t1 in the text data is acquired (step A6) from the description of the node according to, for example, the program of FIG. 5.

Then, the value of the counter variable cnt[fs] corresponding to the acquired font size fs is increased by the acquired number of characters t1 (step A7).

Thereafter, the processes in steps A2 to A7 are carried out repeatedly as described above, which causes the distribution of the font sizes of all the text data displayed on the Web page to be extracted as shown in, for example, (a) of FIG. 9. The extracted font size distribution is stored in the font size distribution memory 24a.

In FIG. 9, font size [S] indicates a font size corresponding to the optimum font size (Sopt) preset in the optimum font size setting memory 24b. In [S−1], [S−2], . . . , [S−1] indicates a font size one pixel (px) smaller than the optimum font size and [S−2] indicates a font size two pixels smaller than the optimum font size. In [S+1], [S+2], . . . , [S+1] indicates a font size one pixel larger than the optimum font size and [S+2] indicates two pixels larger than the optimum font size.

After the font size distribution data on the Web page acquired by the client unit 20 from the server unit has been extracted as shown in (a) of FIG. 9 and stored in the font size distribution memory 24a, the font size changing process of FIG. 8 is activated.

In the font size changing process, the most-frequently-used font size (Sdominant) obtained on the basis of the font size distribution data and stored in the most-frequently-used font size memory 24c is subtracted from the optimum font size (Sopt) preset in the optimum font size setting memory 24b, thereby calculating the difference (Sdiff). The difference is stored in the size difference memory 24d (step B1).

Then, the change target font size (i) is set to "1" for initialization (step B2).

Then, it is determined whether there is a node of the DOM tree which has text to be displayed of the change target font size (i=1) (step B3). If it has been determined that there is not such a node (No in step B3), the change target font size (i) is incremented to "2" (step B7), and it is determined again whether there is a node of the DOM tree which has text to be displayed of the change target font size (i=2) (step B3).

Thereafter, if it has been determined in step B3 that there is a node of the DOM tree which has text to be displayed of the change target font size (i) (Yes in step B3), it is determined whether the font size (i+Sdiff) obtained by adding the size difference (Sdiff) to the change target font size (i) is "0" or less (step B4).

If it has been determined that the font size (i+Sdiff) obtained by adding the size difference (Sdiff) to the change target font size (i) is not "0" or less (No in step B4), the font size of text data at all the nodes displayed in the change target font size (i) is changed on the basis of the size difference (Sdiff) according to, for example, the program of FIG. 6 (step B5).

If it determined that the font size (i+Sdiff) obtained by adding the size difference (Sdiff) to the change target font size (i) is "0" or less (Yes in step B4), the text data of the change target font size (i) is not subjected to the font size changing process in step B5.

Specifically, in step B4, if the optimum font size (Sopt) is smaller than the most-frequently-used font size (Sdominant) and its size difference (Sdiff) takes a negative (or minus "−") value, the change target font size (i) is not subjected to the size difference (Sdiff) changing process, which prevents the text data of the change target font size (i) from disappearing.

Thereafter, in step B6, it is determined whether the change target font size (i) has reached the maximum font size stored in the font size distribution memory 24a for the Web page (step B6). If it has been determined that the change target font size (i) has reached the maximum font size (Yes in step B6), it has been determined that the process of shifting the font size by the size difference (Sdiff=Sopt−Sdominant) to change the font size has been completed for all the text data existing on the Web page and the series of font size changing processes are terminated (End).

For example, as shown in (a) of FIG. 9, if the most-frequently-used font size (Sdominant) of the Web page is 1 (px) smaller than the preset optimum font size (Sopt), the font size of the text data of each of the font sizes Fa, Fb, Fc, . . . existing on the Web page is shifted pixel by pixel as shown in (b) of FIG. 9, thereby carrying out the changing process. Accordingly, the characters of the text data can be changed to those of the user-friendly sizes simultaneously without ruining the size balance between the individual text items throughout the Web page.

Accordingly, with the Web-page font size optimization function of the client unit 20 of the first embodiment, the most-frequently-used font size is determined for the Web page acquired from the server unit 10 and the most-frequently-used font size (Sdominant) is changed to the preset optimum font size (Sopt) and at the same time, the other font sizes are changed as much (Sdiff=Sopt−Sdominant) as in the font size changing process.

This makes it possible to display information on the text considered to be the most important on the Web page in the form of text of the most user-friendly font size without losing the balance of the entire page taken into account in creating the page after the correlation between the font sizes collapsed in the Web page where fonts of different sizes were used.

In the font size optimization function of the first embodiment, all the text items on the Web page have been subjected to a uniform size changing process corresponding to the size difference (Sdiff) between the optimum font size (Sopt) and the most-frequently-used font size (Sdominant) for each of the font sizes (i). In contrast, the invention may be applied to another configuration as explained in a font size optimization function according to a second embodiment of the invention as follows. Not only the optimum font size (Sopt) but also the minimum size (Smin) and the maximum font size (Smax) are preset and a size to be changed is set in the range of the minimum font to the maximum font (Smin to Smax), thereby carrying out a size changing process without losing the balance with the optimum font size (Sopt) as a reference.

Second Embodiment

FIG. 10 is a flowchart to explain a Web-page font-size changing process (II) at the client unit 20 according to a second embodiment of the invention.

FIG. 11 is a diagram showing a comparison between font size distribution data (a) before a change and font size distribution data (b) after the change in the Web-page font-size changing process (II) at the client unit 20 in the second embodiment.

Prepared in a RAM 24 of the client unit 20 of the second embodiment are not only a font size distribution (cnt[fs]:fs=1 to max) memory 24a, an optimum font size setting (Sopt) memory 24b, a most-frequently-used font size (Sdominant) memory 24c, and a change target font size (i) memory 24e but also a minimum font size setting (Smin) memory 24f, a maximum font size setting (Smax) memory 24g, a smallest font size (Ssmallest) memory 24h, a largest font size (Slargest) memory 24i, a number-of-small-size-fonts-to-be-merged (Smerges) memory 24j, a number-of-large-size-fonts-to-be-merged (Smergel) memory 24k, a number-of-fonts-to-be-merged decision (j) memory 24m, a change size setting (k) memory 24n, and others.

The minimum font size setting memory 24f stores the minimum font size (Smin) which is preset according to the screen size of the display unit 26 or set arbitrarily by the user and which enables the user to read sufficiently.

The maximum font size setting memory 24g stores the maximum font size (Smax) which is preset according to the screen size of the display unit 26 or set arbitrarily by the user and which enables the user to read easily.

The smallest font size memory 24h stores the smallest font size (Ssmallest) determined on the basis of the font size distribution data stored in the font size distribution memory 24a.

The largest font size memory 24i stores the largest font size (Slargest) determined on the basis of the font size distribution data stored in the font size distribution memory 24a.

Using equation (a), the number-of-small-size-fonts-to-be-merged memory 24j stores the result of dividing a value obtained by subtracting the smallest font size (Ssmallest) from the most-frequently-used font size (Sdominant) by a value obtained by subtracting the minimum setting font size (Smin) from the optimum font size (Sopt) in the form of the merging number (Smerges) indicating how many text data items (character groups Fa, Fb, . . . ) of the individual font sizes distributed from the most-frequently-used font size (Sdominant) toward the smallest font size are to be merged in such a manner that the data items are caused to correspond to the individual font sizes down to the smallest setting font size (Smin):

$$Smerges=ceil[(Sdominant-Ssmallest)/(Sopt-Smin)] \quad \text{Equation (a)}$$

In the case of a Web page created on the basis of text data whose font size distribution is shown in (a) of FIG. 11, the number-of-small-size-fonts-to-be-merged (Smerges) is "3" according to equation (a).

Using equation (b), the number-of-large-size-fonts-to-be-merged memory 24k stores the result of dividing a value obtained by subtracting the most-frequently-used font size (Sdominant) from the largest font size (Slargest) by a value obtained by subtracting the optimum font size (Sopt) from the maximum setting font size (Smax) in the form of the merging number (Smergel) indicating how many text data items (character groups Ff, Fg, . . . ) of the individual font sizes distributed from the most-frequently-used font size (Sdominant) toward the largest font size are to be merged in such a manner that the data items are caused to correspond to the individual font sizes up to the largest setting font size (Smax):

$$Smerges=ceil[(Slargest-Sdominant)/(Smax-Sopt)] \quad \text{Equation (b)}$$

In the case of a Web page created on the basis of text data whose font size distribution is shown in (a) of FIG. 11, the number-of-large-size-fonts-to-be-merged (Smergel) is "3" according to equation (b).

The number-of-fonts-to-be-merged decision memory 24m stores decision data (j) on the merging number when text data items (character groups Fa, Fb, . . . ) of the individual font sizes distributed from the most-frequently-used font size (Sdominant) toward the smallest font size are merged according to the number of small-size fonts to be merged (Smerges), or when text data items (character groups Ff, Fg, . . . ) of the individual font sizes distributed from the most-frequently-used font size (Sdominant) toward the largest font size are merged according to the number of large-size fonts to be merged (Smergel).

The change size setting memory 24n stores data (k) on the difference from the optimum font size (Sopt) as data for setting a merging font size when text data items (character groups Fa, Fb, . . . ) of the individual font sizes distributed from the most-frequently-used font size (Sdominant) toward the smallest font size are merged according to the number of small-size fonts to be merged (Smerges), or when text data items (character groups Ff, Fg, . . . ) of the individual font sizes distributed from the most-frequently-used font size (Sdominant) toward the largest font size are merged according to the number of large-size fonts to be merged (Smergel).

When the Web page acquired from the server unit 10 is displayed on the display unit 26, if the font size changing process (II) of the second embodiment in FIG. 10 is activated, the font sizes of text data (F) at all the nodes displayed in the most-frequently-used font size (Sdominant) are changed to the optimum font size (Sopt) as shown in (a)→(b) of FIG. 11 (step T1).

Then, each of the change target font size (i), number-of-fonts-to-be-merged decision data (j), and change size setting data (k) is set to "1" for initialization (step T2).

Here, steps T2 to T8 constitute the process of merging text data items (character groups Fa, Fb, . . . ) of the individual font sizes distributed from the most-frequently-used font size (Sdominant) toward the smallest font size according to the number of small-size fonts to be merged (Smerges). Steps T9 to T15 constitute the process of merging text data items (character groups Ff, Fg, . . . ) of the individual font sizes distributed from the most-frequently-used font size (Sdominant) toward the largest font size according to the number of large-size fonts to be merged (Smergel).

Then, it is determined whether the value obtained by subtracting the change target font size (i) from the most-frequently-used font size (Sdominant) is smaller than the smallest font size, that is, whether text of the font size to be changed does not exist in the range smaller than the most-frequently-used font size (Sdominant) (step T3).

For example, on a Web page whose font size distribution is as shown in (a) of FIG. 11, if the value obtained by subtracting the change target font size (i=1) from the most-frequently-used font size (Sdominant) is smaller than the smallest font size (Ssmallest) in the case of the change target font size (i=1) (No in step T3), it is determined whether there is a node which has text data to be displayed (character group Fa) of a font size (Sdominant−i) obtained by subtracting the change target font size (i=1) from the most-frequently-used font size (Sdominant) (step T4).

Here, if it has been determined that there is a node which has text data to be displayed (character group Fa) of the font size (Sdominant−i) (Yes in step T4), it is determined whether the number-of-fonts-to-be-merged data (j) has exceeded the number of small-size fonts to be merged (Smerges) (step T5).

Here, if it has been determined that the number-of-fonts-to-be-merged decision data (j=1) has not exceeded the number of small-size fonts to be merged (Smerges=3) (No in step T5), the font size (S−2 in (a) of FIG. 11) of text data (Fa) at all the nodes displayed in the font size (Sdominant−i) obtained by subtracting the change target font size (i=1) from the most-frequently-used font size (Sdominant) is changed to the font size (Sopt−k: S−1 in (b) of FIG. 11) obtained by subtracting the change size setting data (k=1) from the optimum font size (Sopt) as shown in (a)→(b) of FIG. 11 (step T7).

Then, the change target font size (i=1) and the number-of-fonts-to-be-merged decision data (j=1) are incremented by one, producing the change target font size (i=2) and the number-of-fonts-to-be-merged decision data (j=2) (step T8). Then, the processes in step T3 onward are repeated.

In this case, since it has been determined that the value (S−3) obtained by subtracting the change target font size (i=2) from the most-frequently-used font size (Sdominant) is not smaller than the smallest font size (Ssmallest(S−6)) (No in step T3), that there is a node which has text data to be displayed (character group Fb) of the font size (Sdominant−i= (S−3)) (Yes in step T4), and that the number-of-fonts-to-be-merged decision data (j=2) has not exceeded the number of small-size fonts to be merged (Smearges=3) (No in step T5), the font size (S−3 in (a) of FIG. 11) of text data (Fb) at all the nodes displayed in the font size (Sdominant−i) obtained by subtracting the change target font size (i=2) from the most-frequently-used font size (Sdominant) is changed to the font size (Sopt−k: S−1 in (b) of FIG. 11) obtained by subtracting the same change size setting data (k=1) as last from the optimum font size (Sopt) as shown in (a)→(b) of FIG. 11 (step T7).

Then, as described above, the change target font size (i=2) and the number-of-fonts-to-be-merged decision data (j=2) are incremented by one, producing the change target font size (i=3) and the number-of-fonts-to-be-merged decision data (j=3) (step T8). Then, the processes in step T3 onward are repeated again.

In this case, since it has been determined that the value (S−4) obtained by subtracting the change target font size (i=3) from the most-frequently-used font size (Sdominant) is not smaller than the smallest font size (Ssmallest(S−6)) (No in step T3), that there is a node which has text data to be displayed (character group Fc) of the font size (Sdominant−i= (S−4)) (Yes in step T4), and that the number-of-fonts-to-be-merged decision data (j=3) has not exceeded the number of small-size fonts to be merged (Smearges=3) yet (No in step T5), the font size (S−4 in (a) of FIG. 11) of text data (Fc) at all the nodes displayed in the font size (Sdominant−i) obtained by subtracting the change target font size (i=3) from the most-frequently-used font size (Sdominant) is changed to the font size (Sopt−k: S−1 in (b) of FIG. 11) obtained by subtracting the same change size setting data (k=1) as last from the optimum font size (Sopt) as shown in (a)→(b) of FIG. 11 (step T7).

At this point in time, text data items (Fa), (Fb), (Fc) of the three font sizes (S−2), (S−3), (S−4) shown in (a) of FIG. 11 are merged as shown in (b) of FIG. 11 in such a manner that the font sizes are changed to the same font size (S−1) obtained by subtracting the change size setting data (k=1) from the optimum font size (Sopt).

Then, as described above, when the change target font size (i=3) and the number-of-fonts-to-be-merged decision data (j=3) are incremented by one, producing the change target font size (i=4) and the number-of-fonts-to-be-merged decision data (j=4) (step T8) and the processes in step T3 onward are repeated, it has been determined that the number-of-fonts-to-be-merged decision data (j=4) has exceeded the number of small-size fonts to be merged (Smerges=3) (Yes in step T5). Thus, the change size setting data (k=1) is incremented by one, producing the change size setting data (k=2). At the same time, the number-of-fonts-to-be-merged decision data (j=4) is reset to the number-of-fonts-to-be-merged decision data (j=1) (step T6).

Then, the font size (S−5 in (a) of FIG. 11) of text data (Fd) at all the nodes displayed in the font size (Sdominant−i) obtained by subtracting the change target font size (i=4) from the most-frequently-used font size (Sdominant) is changed to the font size (Sopt−k: S−2 in (b) of FIG. 11) obtained by subtracting the incremented change size setting data (k=2) from the optimum font size (Sopt) as shown in (a)→(b) of FIG. 11 (step T7).

Then, as described above, by way of step T8→step T3 to step T5→step T7, the font size (S−6 in (a) of FIG. 11) of text data (Fe) at all the nodes displayed in the font size (Sdominant−i) obtained by subtracting the change target font size (i=5) from the most-frequently-used font size (Sdominant) is changed to the font size (Sopt−k: S−2 in (b) of FIG. 11) obtained by subtracting the same change size setting data (k=2) as last from the optimum font size (Sopt).

At this point in time, text data items (Fd), (Fe) of the two font sizes (S−5), (S−6) including the smallest font size (Ssmallest) shown in (a) of FIG. 11 are merged as shown in (b) of FIG. 11 in such a manner that the font sizes are changed to the same font size (S−2) obtained by subtracting the change size setting data (k=2) from the optimum font size (Sopt).

Thereafter, as described above, if the change target font size (i=5) and the number-of-fonts-to-be-merged decision data (j=2) are incremented by one, producing the change target font size (i=6) and the number-of-fonts-to-be-merged decision data (j=3) (step T8) and control returns to the processes in step T3 onward, a value obtained by subtracting the change target font size (i=6) from the most-frequently-used font size (Sdominant) is smaller than the smallest font size (Smallest (S−6)), with the result that it has been determined that there is no text of the font size to be changed in the range smaller than the most-frequently-used font size (Sdominant) (Yes in step T3). Therefore, in steps T9 to T15, control is passed to the process of merging text data (character groups Ff, Fg, . . . ) of the individual font sizes distributed in the range larger than the most-frequently-used font size (Sdominant) according to the number of large-size fonts to be merged (Smergel).

Specifically, if each of the change target font size (i), number-of-fonts-to-be-merged decision data (j), and change size setting data (k) is reset to "1" for initialization (step T9), it is determined whether a value obtained by adding the change target font size (i) to the most-frequently-used font size (Sdominant) exceeds the largest font size (Slargest), that is, whether text of the font size to be changed does not exist in the range larger than the most-frequently-used font size (Sdominant) (step T10).

For example, in the case of the change target font size (i=1) on the Web page whose font size distribution is as shown in (a) of FIG. 11, if it has been determined that a value obtained by adding the change target font size (i=1) to the most-frequently-used font size (Sdominant) has not exceeded the largest font size (Slargest) (No in step T10), it is determined whether there is a node which has text data to be displayed (character group Ff) of the font size (Sdominant+i) obtained by adding the change target font size (i=1) to the most-frequently-used font size (Sdominant) (step T11).

If it is determined that there is a node which has text data to be displayed (character group Ff) of the font size (Sdominant+i) (Yes in step T11), it is determined whether the number-of-fonts-to-be-merged decision data (j) has exceeded the number of large-size fonts to be merged (Smergel) (step T12).

If it has been determined that the number-of-fonts-to-be-merged decision data (j=1) has not exceeded the number of large-size fonts to be merged (Smergel=3) (No in step T12), the font size (S in (a) of FIG. 11) of text data (Ff) at all the nodes displayed in the font size (Sdominant+i) obtained by adding the change target font size (i=1) to the most-frequently-used font size (Sdominant) is changed to the font size (Sopt+k: S+1 in (b) of FIG. 11) obtained by adding the change size setting data (k=1) to the optimum font size (Sopt) (step T14).

Then, the change target font size (i=1) and the number-of-fonts-to-be-merged decision data (j=1) are incremented by one, producing the change target font size (i=2) and the number-of-fonts-to-be-merged decision data (j=2) (step T15). Then, the processes in step T10 onward are repeated.

In this case, since it has been determined that the value (S+1) obtained by adding the change target font size (i=2) to the most-frequently-used font size (Sdominant) has not exceeded the largest font size (Slargest(S+4)) (No in step T10), that there is a node which has text data to be displayed (character group Fg) of the font size (Sdominant+i=(S+1)) (Yes in step T11), and that the number-of-fonts-to-be-merged decision data (j=2) has not exceeded the number of large-size fonts to be merged (Smergel=3) yet (No in step T12), the font size (S+1 in (a) of FIG. 11) of text data (Fg) at all the nodes displayed in the font size (Sdominant+i) obtained by adding the change target font size (i=2) to the most-frequently-used font size (Sdominant) is changed to the font size (Sopt+k: S+1 in (b) of FIG. 11) obtained by adding the same change size setting data (k=1) as last to the optimum font size (Sopt) (step T14).

Then, as described above, the change target font size (i=2) and the number-of-fonts-to-be-merged decision data (j=2) are incremented by one, producing the change target font size (i=3) and the number-of-fonts-to-be-merged decision data (j=3) (step T15). Then, the processes in step T10 onward are repeated again.

In this case, since it has been determined that the value (S+2) obtained by adding the change target font size (i=3) to the most-frequently-used font size (Sdominant) has not exceeded the largest font size (Slargest(S+4)) (No in step T10), that there is a node which has text data to be displayed (character group Fh) of the font size (Sdominant+i=(S+2)) (Yes in step T11), and that the number-of-fonts-to-be-merged decision data (j=3) has not exceeded the number of large-size fonts to be merged (Smergel=3) (No in step T12), the font size (S+2 in (a) of FIG. 11) of text data (Fh) at all the nodes displayed in the font size (Sdominant+i) obtained by adding the change target font size (i=3) to the most-frequently-used font size (Sdominant) is changed to the font size (Sopt+k: S+1 in (b) of FIG. 11) obtained by adding the same change size setting data (k=1) as last to the optimum font size (Sopt) (step T14).

At this point in time, text data items (Ff), (Fg), (Fh) of the three font sizes (S), (S+1), (S+2) shown in (a) of FIG. 11 are merged as shown in (b) of FIG. 11 in such a manner that the font sizes are changed to the same font size (S+1) obtained by adding the change size setting data (k=1) to the optimum font size (Sopt).

Then, as described above, when the change target font size (i=3) and the number-of-fonts-to-be-merged decision data (j=3) have been incremented by one, producing the change target font size (i=4) and the number-of-fonts-to-be-merged decision data (j=4) (step T15), and the processes in step T10 onward have been repeated, it has been determined that there is no node which has text data to be displayed of the font size (Sdominant+i=(S+3)) (No in step T11). Thus, the change target font size (i=4) and the number-of-fonts-to-be-merged decision data (j=4) are incremented by one, producing the change target font size (i=5) and the number-of-fonts-to-be-merged decision data (j=5) (step T15). Then, the processes in step T10 onward are repeated.

In this case, since it has been determined that there is a node which has text data to be displayed (Fi) of the font size (Sdominant+i=(S+4)) obtained by adding the change target font size (i=5) to the most-frequently-used font size (Sdominant) (Yes in step T11) and that the number-of-fonts-to-be-merged decision data (j=5) has exceeded the number of large-size fonts to be merged (Smergel=3) (Yes in step T12), the change size setting data (k=1) is incremented by one, producing the change size setting data (k=2), and the same time, the number-of-fonts-to-be-merged decision data (j=5) is reset to the number-of-fonts-to-be-merged decision data (j=1) (step T13).

Then, the font size (S+4 in (a) of FIG. 11) of text data (Fi) at all the nodes displayed in the font size (Sdominant+i) obtained by adding the change target font size (i=5) to the most-frequently-used font size (Sdominant) is changed to the font size (Sopt+k: S+2 in (b) of FIG. 11) obtained by adding the incremented change size setting data (k=2) to the optimum font size (Sopt) as shown in (a)→(b) of FIG. 11 (step T14).

Thereafter, as described above, the change target font size (i=5) and the number-of-fonts-to-be-merged decision data (j=1) are incremented by one, producing the change target font size (i=6) and the number-of-fonts-to-be-merged decision data (j=2) (step T15). Then, control is returned to the processes in step T10 onward. As a result, it has been determined that the value obtained by adding the change target font size (i=6) to the most-frequently-used font size (Sdominant) has exceeded the largest font size (Slargest(S+4)) and that there is no text of the font size to be changed in the range larger than the most-frequently-used font size (Sdominant) (Yes in step T10). Accordingly, the series of font size changing processes are terminated (End).

Accordingly, with the Web-page font size optimization function of the client unit 20 configured as described above, not only the optimum font size (Sopt) but also the minimum font size (Smin) and maximum font size (Smax) the user can read sufficiently are preset and the most-frequently-used font size (Sdominant) is changed to the optimum font size (Sopt). Then, the individual font sizes in the range smaller than the most-frequently-used font size (Sdominant) are changed so as to be distributed uniformly in the range from the preset minimum font size (Smin) to the optimum font size (Sopt). Moreover, the individual font sizes in the range larger than the most-frequently-used font size (Sdominant) are changed so as to be distributed uniformly in the range from the preset maximum font size (Smax) to the optimum font size (Sopt).

This makes it possible to eliminate text which is too small to read or too large to view without losing the correlation between the font sizes seriously and impairing the balance of the entire page taken into account in creating the Web page and display the whole of the Web page in an easy-to-read manner, even when a Web page where font sizes are distributed over a wide range is displayed on a small screen of, for example, a mobile phone.

In the font size optimization function of each of the first and second embodiments, pixel values (px) have been used as font sizes. Even when a display font size is determined by specifying a percentage of the font size with a default font size as a reference, the font size optimization function may be applied.

While in each of the first and second embodiments, the optimum font size (Sopt) has been preset according to the display screen of the display unit 26 or set arbitrarily by the user, table data for setting the optimum font size (Sopt) according to the display screen size may be stored in advance together with a font size changing program and the optimum font size (Sopt) may be selected automatically according to the display screen size.

As for the most-frequently-used font size (Sdominant) set on the basis of the Web-page font size distribution data in each of the first and second embodiments, a font size whose frequency of use is relatively high (Sdominant) may be used in place of the most-frequently-used font size (Sdominant).

In each of the first and second embodiments, various application programs have been installed in the client unit 20 used as the information output apparatus and the client unit 20 has been used as a PC, a PDA, or a mobile phone which can operate independently. In contrast, when a Web page received from the server unit is displayed using an easy-to-read font size in a balanced manner in a client unit of a server-based computing (SBC) system typified by a thin client system, the font size distribution extraction program shown in FIG. 7 and the font size changing programs (I), (II) shown in FIGS. 8 and 10 are installed in the server unit. Then, the server unit carries out the Web-page font size changing process on the basis of the display screen size of the client unit in response to a Web page request access from the client unit and delivers the resulting Web page to the client unit.

While in each of the first and second embodiments, the font size optimization function has been applied to a case where the client unit displays a Web page, it may be applied without any modification to a case where a printer unit prints out data. In this case, the printer unit sets the optimum font size (Sopt) according to the print size.

The font size optimization function may be applied not only to Web pages but also to pages for display or printing where text items of a plurality of font sizes are mixed, which produces the same operational advantages.

The methods used in the individual processes at the information processing apparatus of each of the first and second embodiments, including the font size distribution extraction process shown in the flowchart of FIG. 7, the font size changing process (I) of the first embodiment shown in the flowchart of FIG. 8, and the font size changing process (II) of the second embodiment shown in the flowchart of FIG. 10, can be stored in a medium of an external storage unit 28*a* (18*a*), such as a memory card (e.g., a ROM card or a RAM card), a magnetic disk (e.g., a floppy disk or a hard disk), an optical disk (e.g., a CD-ROM or a DVD), or a semiconductor memory, in the form of programs the computer can execute. Then, the program-stored mediums can be delivered. The computer (CPU 21 (11)) of the information output apparatus reads the program stored in the medium of the external storage unit 28*a* (18*a*) into a storage unit (e.g., a flash ROM 23 (13) or a RAM 24 (14)). The computer is controlled by the read program, thereby realizing the font size optimization function explained in each of the first and second embodiments, which enables the same processes to be carried out by the aforementioned methods.

Furthermore, the data of the programs which realize the above methods can be transferred in the form of program code through a communication network (N). The program data can be loaded from a computer unit (or a program server) connected to the communication network (N) into a storage unit (e.g., a flash ROM 23 (13) or a RAM 24 (14)), thereby realizing the font size optimization function.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A non-transitory computer program storage medium readable by a computer system and encoding a computer program for executing a computer process for displaying information on a video display, the computer process comprising:

presetting a specified font size, a minimum setting font size, and a maximum setting font size for the font sizes of text items included in display data, wherein the display data is a Web page having text that includes text items;

extracting the frequency of use for each of the font sizes of text items included in the display data, determining a font size whose frequency of use is high among the frequencies of use of the font sizes, setting a condition for uniformly merging the font size of text for each of the font sizes smaller than the font size with a high frequency of use to correspond to the individual font sizes in the range from the preset specified font size to the minimum setting font size, setting a condition for uniformly merging the font size of text for each of the font sizes larger than the font size with a high frequency of use to correspond to the individual font sizes in the range from the preset specified font size to the maximum setting font size, changing text of the font size with a high frequency of use to text of the preset specified font size, changing the font size of text for each of the font sizes smaller than the font size with a high frequency of use according to the condition set by the changing of text of the font size with a high frequency of use, changing the font size of text for each of the font sizes larger than the font size with a high frequency of use according to the condition set by the changing of the font size of text for each of the font sizes smaller than the font size with a high frequency of use; and displaying, on the video display, both the text items whose font size has been changed from an original font size and text items whose font size has not been change from the original font size, wherein the text items are displayed in various sizes on the Web page having the text without losing a size balance of the text items, wherein the determining the font size whose frequency of use is high includes determining the font size with a high frequency of use among the frequencies of use of font sizes extracted by the extracting, the maximum font size, and minimum font size, the setting the condition for uniformly merging the font size of text for each of the font sizes smaller than the font size includes dividing a value obtained by subtracting the minimum font size from the font size with a high frequency of use by a value obtained by subtracting the minimum setting font size from the specified font size preset by the presetting, applying a ceiling function to a result of the dividing, and setting the result of the dividing as the condition for the number of text items of the individual font sizes smaller than the font size with a high frequency of use to be merged to correspond to the font sizes in the range from the preset specified font size to the minimum setting font size, the setting the condition for uniformly merging the font size of text for each of the font sizes larger than the font size includes dividing a value obtained by subtracting the font size with a high frequency of use from the maximum font size by a value obtained by subtracting the specified font size from the maximum setting font size preset by the presetting, applying the ceiling function to a result of the dividing and setting the result of the dividing as the condition for the number of text items of the individual font sizes larger than the font size with a high frequency of use to be merged to correspond to the font sizes in the range from the preset specified font size to the maximum setting font size, the changing of the font size of text for each of the font sizes smaller that the font size with the high frequency of user further changes text items of the individual font sizes smaller than the font size with a high frequency of use to correspond to the font sizes in the range from the preset specified font size to the minimum setting font size according to the condition for the number of text items to be merged set by the first condition setting process, and the changing of the font size of text for each of the font sizes larger that the font size with a high frequency of use further changes text items of the individual font sizes larger than the font size with a high frequency of use to correspond to the font sizes in the range from the preset specified font size to the maximum setting font size according to the condition for the number of text items to be merged set by the second condition setting process.

2. A method for displaying information on a video display, the method comprising:

presetting, by a system that includes a processor, a specified font size, a minimum setting font size, and a maximum setting font size for the font sizes of text items included in display data, wherein the display data is a Web page having text that includes text items;

extracting, by the system, the frequency of use for each of the font sizes of text items included in the display data, determining, by the system, a font size whose frequency of use is high among the frequencies of use of the font sizes extracted by the extracting, setting, by the system, a condition for uniformly merging the font size of text for each of the font sizes smaller than the font size with a high frequency of use to correspond to the individual font sizes in the range from the preset specified font size to the minimum setting font size, setting, by the system, a condition for uniformly merging the font size of text for each of the font sizes larger than the font size with a high frequency of use to correspond to the individual font sizes in the range from the preset specified font size to the maximum setting font size, changing, by the system, text of the font size with a high frequency of use to text of the preset specified font size, changing, by the system, the font size of text for each of the font sizes smaller than the font size with a high frequency of use according to the condition set by the setting the condition for uniformly merging the font size of text for each of the font sizes smaller than the font size, changing, by the system, the font size of text for each of the font sizes larger than the font size with a high frequency of use according to the condition set by the setting the condition for uniformly merging the font size of text for each of the font sizes larger than the font size; and displaying, on the video display, both the text items whose font size has been changed from an original font size and text items whose font size has not been changed from the original font size, wherein the text items are displayed in various sizes on the Web page having the text without losing a size balance of the text items, wherein the determining the font size whose frequency of use is high among the frequencies of use further includes determining, by the system, the font size with a high frequency of use among the frequencies of use of font sizes extracted by the extracting the frequency of use for each of the font sizes of the text items included in the display data, the maximum font size, and minimum font size, the setting the condition for uniformly merging the font size of text for each of the font sizes smaller than the font size with a high frequency of use includes dividing a value obtained by subtracting the minimum font size from the font size with a high frequency of use by a value obtained by subtracting the minimum setting font size from the specified font size preset by the presetting, applying a ceiling function to a result of the dividing, and setting the result of the dividing as the condition for the number of text items of the individual font sizes smaller than the font size with a high frequency of use to be merged to correspond to the font sizes in the range from the preset specified font size to the minimum setting font size, the setting the condition for uniformly merging the font size of text for each of the font sizes larger than the font size further includes dividing a value obtained by subtracting the font size with a high frequency of use from the maximum font size by a value obtained by subtracting be specified font size from the maximum setting font size preset by the presetting, applying the ceiling function to a result of the dividing, and setting the result of the dividing as the condition for the number of text items of the individual font sizes larger than the font size with a high frequency of use to be merged to correspond to the font sizes in the range from the preset specified font size to the maximum setting font size, the changing the font size of text for each of the font sizes smaller than the font size with a high frequency of use changes text items of the individual font sizes smaller than the font size with a high frequency of use to correspond to the font sizes in the range from the preset specified font size to the minimum setting font size according to the condition for the number of text items to be merged set by the setting the condition for uniformly merging the font size of text for each of the font sizes smaller than the font size with a high frequency of use, and the changing the font size of text for each of the font sizes larger than the font size with a high frequency of use changes text items of the individual font sizes larger than the font size with a high frequency of use to correspond to the font sizes in the range from the preset specified font size to the maximum setting font size according to the condition for the number of text items to be merged set by the setting the condition for uniformly merging the font size of text for each of the font sizes larger than the font size.

* * * * *